No. 632,465. Patented Sept. 5, 1899.
L. R. KING.
SPRING MOTOR.
(Application filed Feb. 3, 1898.)
(No Model.) 2 Sheets—Sheet 2.
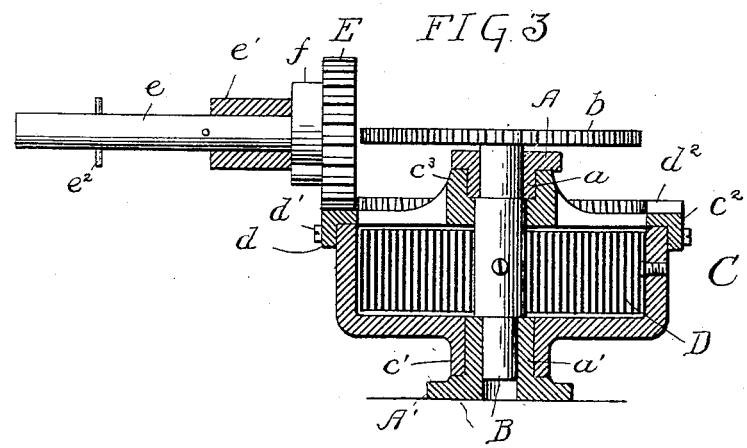
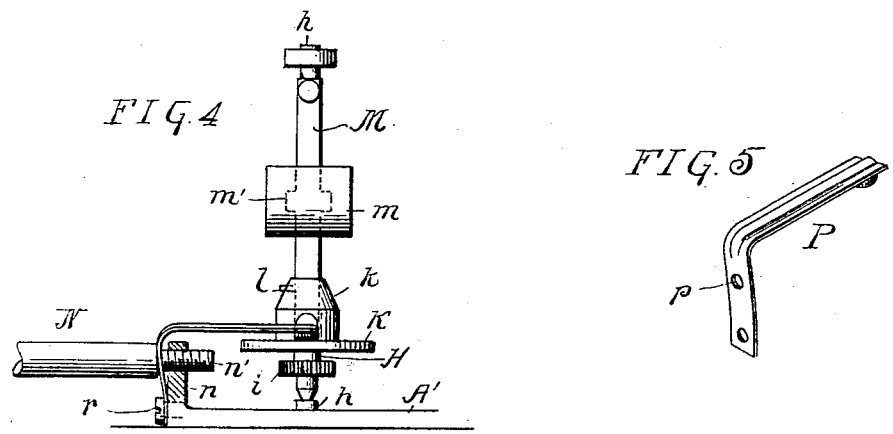
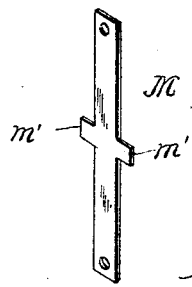
Witnesses:
Inventor
Louis R. King.
by his Attorney

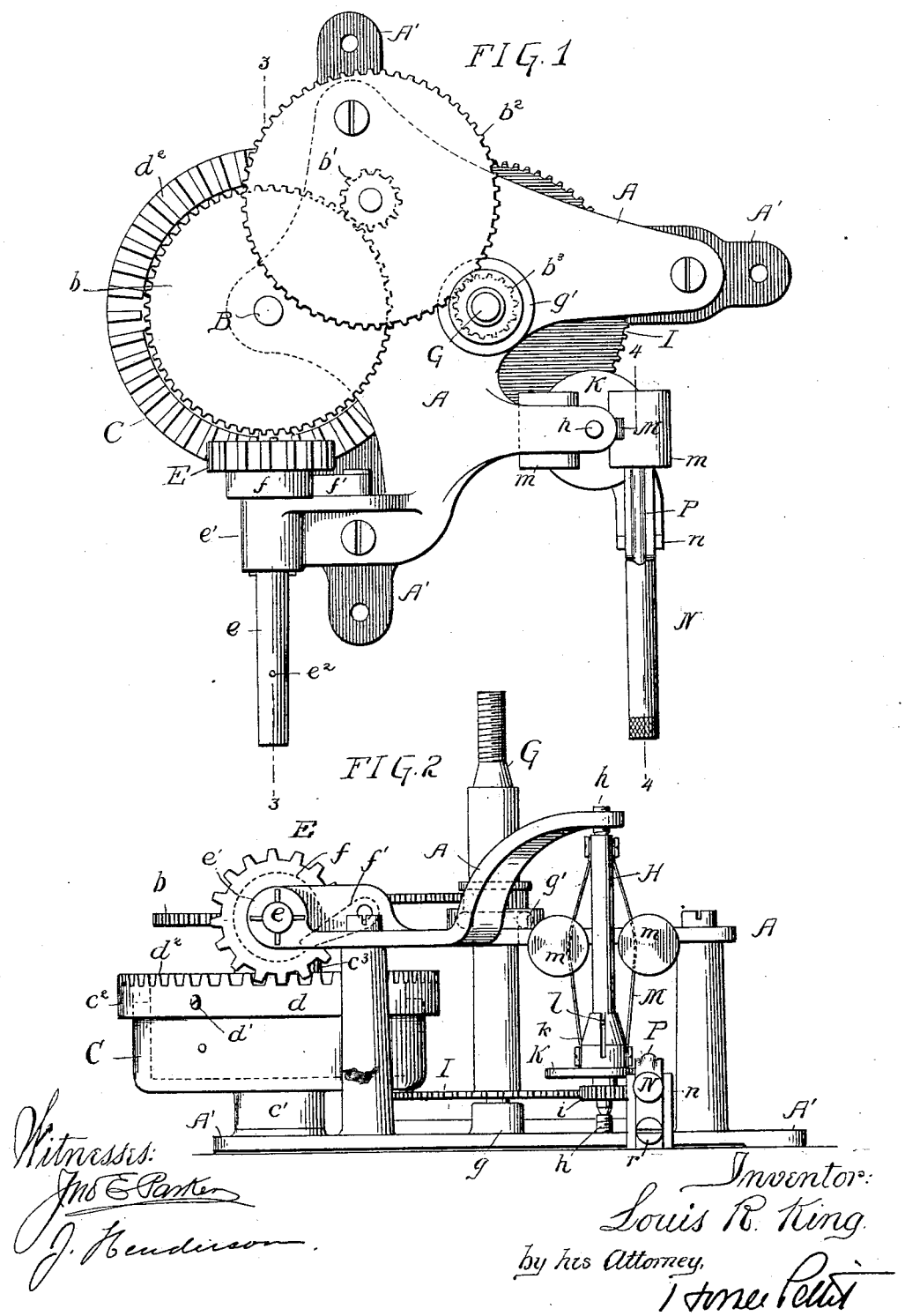

UNITED STATES PATENT OFFICE.

LOUIS R. KING, OF PHILADELPHIA, PENNSYLVANIA.

SPRING-MOTOR.

SPECIFICATION forming part of Letters Patent No. 632,465, dated September 5, 1899.

Application filed February 3, 1898. Serial No. 668,936. (No model.)

*To all whom it may concern:*

Be it known that I, LOUIS R. KING, a citizen of the United States, and a resident of the city of Philadelphia, State of Pennsylvania, have invented certain new and useful Improvements in Spring-Motors, of which the following is a full, clear, and exact description, reference being had to the accompanying drawings, forming part of this specification.

My invention relates to certain improvements in spring-motors, and has for its object to provide an improved form of motor of simple construction adapted more especially for the operation of gramophones or other like apparatus of similar character.

In the accompanying drawings, Figure 1 is a plan view of a spring-motor constructed in accordance with my invention. Fig. 2 is an elevation of the same. Fig. 3 is a transverse sectional elevation of a portion of the motor on the line 3 3, Fig. 1. Fig. 4 is a similar view on the line 4 4, Fig. 1; and Figs. 5 and 6 are detached perspective views of details of construction more specifically referred to hereinafter.

The spring-motor forming the subject of the present invention is designed more especially for actuating gramophones; and a principal object of the invention is to provide a motor which will be compact and of simple and economical construction and provided with a suitable governor for maintaining an even and regular speed throughout the unwinding of the actuating-spring.

Referring to the drawings, A A' represent, respectively, the upper and lower plates forming the framework in which all of the movable parts of the motor are supported. Both the upper and the lower plates are provided with projecting bosses $a$, having suitable openings for the reception of a power-transmitting shaft E, on the upper end of which is carried the initial gear $b$. The bosses serve as bearings for the upper and lower portions of a rotating spring-cage C. This cage comprises a main cup-shaped portion having pending annular flange $c'$, which surrounds the boss $a$ of the lower plate A', and an upper section $c^2$, having a central hub $c^3$, which surrounds and is guided by the boss $a$ of the upper plate A. The section $c^2$ has a flanged outer edge $d$, which fits over the upper edge of the cup-shaped portion $c$ and is secured thereto by screws $d'$, or the two sections may be provided with interlocking grooves in order to avoid the expense of boring and tapping the sections for the reception of the screws. Within the cage is a spiral spring D, secured at one end to the inner surface of the cage C and at its opposite inner end being secured to the power-transmitting shaft B, and on the upper face of the section $c^2$ of the cage is formed a series of teeth forming a contrate or crown gear $d^2$, with which intermeshes a pinion E, supported on a shaft $e$, adapted to a suitable bearing $e'$ on the upper plate A. The shaft $e$ is provided with a projecting pin $e^2$ for the reception of a winding-key, or its outer end may be squared, as for the reception of the usual type of clock-key. On the shaft $e$ is a ratchet-wheel $f$, with which engages a pinion $f'$, pivoted to the frame and acting to prevent any backward movement of the winding-shaft on the spring-cage.

G represents a vertically-arranged shaft resting at its lower end on a step $g$, and at the point where it passes through the other plate A of the frame is provided with a ball-bearing $g'$. The shaft G is the final or driven shaft of the motor and is connected to the transmitting-shaft B by the gear-wheels and pinions $b$, $b'$, $b^2$, and $b^3$, and on its upper end may be secured the record-carrying platform of a gramophone, or it may be provided with a gear or other wheel for transmitting the power to other forms of machine.

On the upper and lower plates A A' are pins $h$, serving as upper and lower bearings for a governor-shaft H, provided near its lower end with a pinion $i$, which intermeshes with and is driven by a gear-wheel I on the lower end of the shaft G.

On the governor-shaft H is mounted a disk K, having a hub $k$, slotted for the reception of a pin $l$, which permits of the vertical movement of the disk while rotating with the shaft.

A suitable brake mechanism, such as illustrated in Fig. 4 of the drawings, or any other suitable construction may be provided for regulating the speed of the governor-spindle.

In winding the motor the shaft $e$ is turned by a suitable key and the spring-cage is rotated in such manner as to wind up the spiral spring from its outer end, the spring-cage being held when the spring is wound by the ratchet-wheel $f$ and pawl $f'$, while in the unwinding of the spring the transmitting-shaft B is rotated and through the train of gearing rotates the final shaft of the series.

Having thus described my invention, what I claim, and desire to secure by Letters Patent, is—

1. In a spring-motor the combination of a main supporting-frame provided with the inwardly-extending bosses, $a$, $a'$ a power-transmitting shaft, B, journaled in said bosses, a two-part spring-cage loosely mounted on said shaft, B, and having hubs adapted to fit over and be guided on the said bosses, an actuating-spring, D, secured at one end to the transmitting-shaft and at its other end to the inner surface of the cage, substantially as described.

2. In a spring-motor, the combination of the supporting-frame, a spring-cage comprising a lower cup-shaped portion, $c$, and upper disk-shaped portion, $c^2$, having flanges adapted to embrace the lower portion, $c$, teeth, $d^2$, formed on the upper surface of said upper portion, bearings on said upper and lower sections adapted to engage and be guided on bosses in the supporting-frame, a centrally-located transmitting-shaft, B, adapted to bearings in the frame, an actuating-spring secured at one end to the shaft and at its opposite end to the cage, a horizontally-disposed winding-shaft, $e$, and a pinion, E, on said shaft adapted to intermesh with the teeth, $d^2$, of the cage, substantially as described.

3. In a spring-motor, the combination of the supporting-frames, A, A', having inwardly-projecting bosses, $a$, $a'$ a spring-cage comprising a lower cup-shaped section, $c$, having a depending hub, $c'$, adapted to the boss, $a'$, of the lower frame, an upper section, $c^2$, having an annular flange, $d$, adapted to embrace and be secured to the lower section, $c$, teeth, $d^2$ formed integral with said upper section, a central hub, $c^3$, adapted to the boss $a$, a power-shaft, B, adapted to bearings in the bosses, $a$, $a'$, an actuating-spring provided within the cage having one end secured to the said power-shaft and the other end to the cage, and a horizontally-disposed winding-shaft carrying a pinion, E, adapted to mesh with the teeth, $d^2$, on the upper cage-section, substantially as described.

4. The combination in a spring-motor, of a supporting-frame, inwardly-extending bosses provided thereon, a power-shaft journaled therein a two-part spring-cage loosely mounted on said power-shaft and having hubs adapted to fit over the bosses on the frame, an actuating-spring located in said cage having one end fastened to the cage and the inner end to the power-shaft, a driven shaft, G, gearing connecting the said shaft, G, with the power-shaft, a step-bearing for the lower end of shaft, G, and a ball-bearing, $g'$ surrounding said shaft and adapted to keep the same in a central position, substantially as described.

In witness whereof I have hereunto set my hand this 21st day of January, A. D. 1898.

LOUIS R. KING.

Witnesses:
HORACE PETTIT,
JNO. E. PARKER.